(12) United States Patent
Yamamoto et al.

(10) Patent No.: US 7,341,210 B2
(45) Date of Patent: Mar. 11, 2008

(54) NOZZLE CAP FOR SEALING NOZZLE PARTICULARLY USED TO CHARGE WITH HIGH PRESSURIZED FLUID

(75) Inventors: Masahiko Yamamoto, Gifu-ken (JP); Hajime Mukawa, Aichi-pref (JP); Yoshitaka Tomatsu, Aichi (JP)

(73) Assignees: Pacific Industrial Co., Ltd., Ogaki (JP); Denso Corporation, Kariya (JP)

( * ) Notice: Subject to any disclaimer, the term of this patent is extended or adjusted under 35 U.S.C. 154(b) by 630 days.

(21) Appl. No.: 10/713,124

(22) Filed: Nov. 14, 2003

(65) Prior Publication Data

US 2004/0124289 A1 Jul. 1, 2004

(30) Foreign Application Priority Data

Dec. 9, 2002 (JP) .............................. 2002-356488

(51) Int. Cl.
*B05B 1/00* (2006.01)
(52) U.S. Cl. .................. 239/600; 239/569; 277/641; 277/640; 277/637
(58) Field of Classification Search ................ 239/569, 239/570, 571, 572, 600; 277/644, 626, 637, 277/640, 641, 642; 62/292; 137/322, 590
See application file for complete search history.

(56) References Cited

U.S. PATENT DOCUMENTS

| | | | | |
|---|---|---|---|---|
| 1,628,028 A | * | 5/1927 | Calhoun | 220/849 |
| 1,814,678 A | * | 7/1931 | Ferguson | 29/525 |
| 2,903,888 A | * | 9/1959 | Gfoll | 73/146.8 |
| 2,989,209 A | * | 6/1961 | Hersman | 220/327 |
| 2,995,057 A | * | 8/1961 | Nenzell | 411/399 |
| 3,232,097 A | * | 2/1966 | Childs et al. | 137/7 |
| 3,297,049 A | * | 1/1967 | Moskovitz | 137/540 |
| 3,336,936 A | * | 8/1967 | Mullins | 137/234.5 |
| 3,640,424 A | * | 2/1972 | Ando | 220/288 |
| 3,854,735 A | * | 12/1974 | Maurer et al. | 277/638 |
| 5,653,256 A | * | 8/1997 | Myers et al. | 137/454.2 |
| 5,921,468 A | * | 7/1999 | Palestrant | 239/383 |
| 6,290,238 B1 | * | 9/2001 | Johnson, Jr. | 277/613 |
| 6,962,351 B2 | * | 11/2005 | De Freitas | 277/634 |
| 2004/0036232 A1 | * | 2/2004 | Fluck et al. | 277/641 |

FOREIGN PATENT DOCUMENTS

| | | |
|---|---|---|
| JP | 52-079410 A | 7/1977 |
| JP | 57-080794 U1 | 5/1982 |
| JP | 58-098348 A | 7/1983 |
| JP | 59 032796 U1 | 2/1984 |
| JP | 60-185607 A | 9/1985 |

(Continued)

*Primary Examiner*—Kevin Shaver
*Assistant Examiner*—Trevor McGraw
(74) *Attorney, Agent, or Firm*—Oliff & Berridge, PLC

(57) ABSTRACT

A nozzle cap is disclosed which is threadedly engaged with a distal end of a nozzle through which a compressed fluid is passed. The nozzle cap includes a terminal wall opposed to a distal end face of the nozzle axially with respect to the nozzle, a sealing member placed on the terminal wall so as to adhere closely to the distal end of the nozzle thereby to seal an opening of the nozzle, and a holding wall pressing and holding an edge of the sealing member in co-operation with the terminal wall between the walls.

9 Claims, 7 Drawing Sheets

FOREIGN PATENT DOCUMENTS

| | | |
|---|---|---|
| JP | 61-029804 U1 | 2/1986 |
| JP | 05-312439 | 11/1993 |
| JP | 08-145516 | 6/1996 |
| JP | 2001-241553 | 9/2001 |
| JP | 2001-287521 | 10/2001 |
| JP | 2002-022015 | 1/2002 |

* cited by examiner

NOZZLE CAP FOR SEALING NOZZLE PARTICULARLY USED TO CHARGE WITH HIGH PRESSURIZED FLUID

BACKGROUND OF THE INVENTION

1. Field of the Invention

This invention relates generally to a nozzle cap threadedly engaged with a distal end of a nozzle, and more particularly to such a nozzle cap threadedly engaged with a nozzle which is used to charge an air conditioner with a refrigerant.

2. Description of the Related Art

Conventional nozzle caps comprise a thread adapted to be threadedly engaged with a distal end of a nozzle and a terminal wall provided at a proximal end side of the thread so that the distal end of the nozzle is butted against the proximal end. A sealing member provided on the terminal wall is closely adhered to the distal end of the nozzle so that the nozzle cap seals an opening of the nozzle. Such a sealing member is shown by reference numeral 12 in JP-A-2001-287521 or by reference numeral 24 in JP-A-5-312439.

In the above-described nozzle cap, the sealing member is merely placed on the terminal wall or simply engaged with the thread. Accordingly, there is a possibility that the sealing member may separate from the body of the nozzle cap. The assignee of the present application examined the cause for separation of the sealing member and found that the sealing member, when pressed against the nozzle, adhered to the nozzle. When the nozzle cap is disengaged from the nozzle, the sealing member separates from the thread of the cap to remain at the nozzle side. Particularly in the nozzle cap used for a nozzle through which a high pressurized fluid such as an air conditioner refrigerant, the sealing member is subjected to a large inner pressure to be pressed against the nozzle, thereby adhered to the nozzle. Thus, the sealing member cannot be prevented from separation in the conventional nozzle caps.

SUMMARY OF THE INVENTION

Therefore, an object of the present invention is to provide a nozzle cap which can prevent the sealing member from separation therefrom.

The present invention provides a nozzle cap threadedly engaged with a distal end of a nozzle through which a compressed fluid is capable of passing. The nozzle cap comprises a terminal wall opposed to a distal end face of the nozzle axially with respect to the nozzle, a sealing member placed on the terminal wall so as to adhere closely to the distal end of the nozzle thereby to seal an opening of the nozzle, and a holding wall pressing and holding an edge of the sealing member in co-operation with the terminal wall therebetween.

In the foregoing nozzle cap, the edge of the sealing member is pressed between the terminal wall and the holding wall to be held therebetween. Consequently, the sealing member can be prevented from removal from the nozzle cap even when adherent to the nozzle upon disengagement of the nozzle cap from the nozzle.

In a preferred form, at least one of the terminal wall and the holding wall or a portion of the holding wall opposed to the protruding wall is provided with an engagement protrusion biting into the sealing member. Since the engagement protrusion penetrates the sealing member, the sealing member can be prevented from dropping out of the space between the terminal and holding walls.

In another preferred form, the holding wall is disposed at a position where the distal end face of the nozzle is butted against the holding wall. When the distal end face of the nozzle is butted against the holding wall, the holding wall can be prevented from deforming in such a direction that the holding member departs from the sealing member. Consequently, the sealing member can reliably be held between the terminal and holding walls.

In further another preferred form, the nozzle cap further comprises a generally cylindrical cover fitted with an outer periphery of the cap so as to surround the sealing member. In this construction, the cylindrical cover can be fitted with the cap after attachment of the sealing member. Consequently, the sealing member can be attached easily. Furthermore, the sealing member can be protected by the cylindrical cover.

BRIEF DESCRIPTION OF THE DRAWINGS

Other objects, features and advantages of the invention will become clear upon reviewing the following description of embodiments, made with reference to the accompanying drawings, in which.

DETAILED DESCRIPTION OF THE INVENTION

Figure 1:
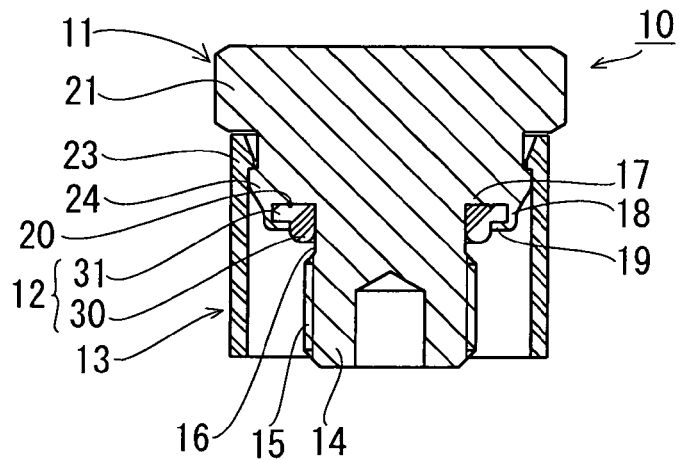
FIG. 1 is a side section of a nozzle and a nozzle cap in accordance with one embodiment of the present invention.
Figure 1:
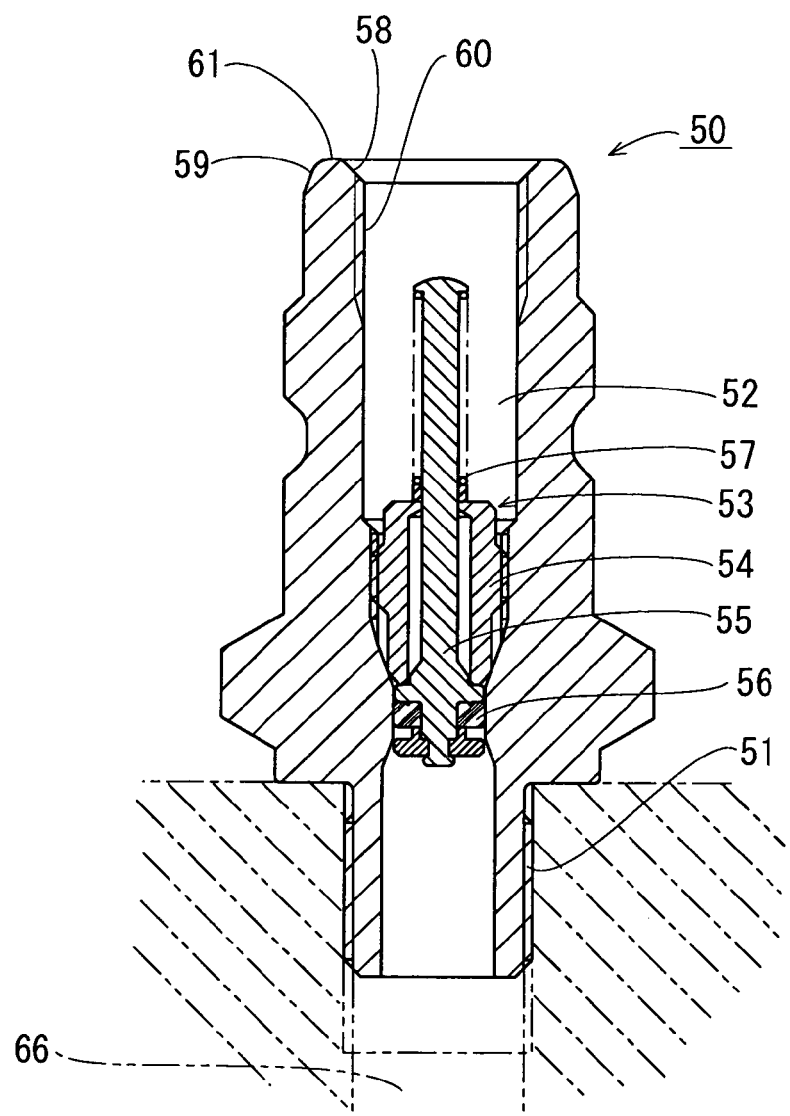
Figure 2:
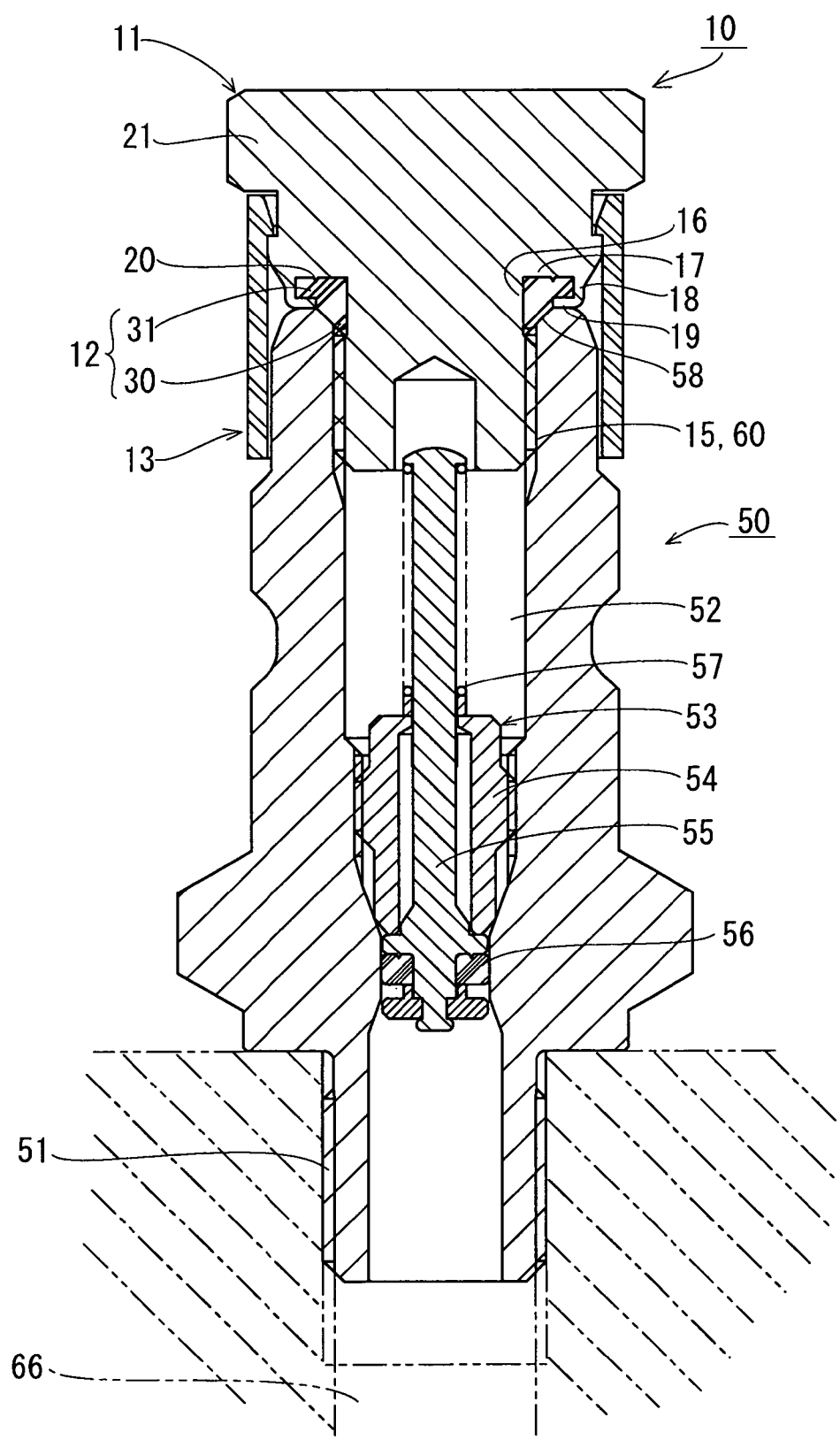
FIG. 2 is a side section of the nozzle and nozzle cap attached to the nozzle.

An embodiment of the present invention will be described with reference to FIGS. 1 to 4. In the embodiment, a nozzle cap 10 is attached to a nozzle 50 through which a car air-conditioner is charged with a refrigerant serving as a compressed fluid. The nozzle 50 has a proximal end provided with a male thread 51. The male thread 51 is threadedly engaged with a suitable component of the car air-conditioner, whereby a flow passage 52 inside the nozzle 50 communicates with a refrigerant passage 66 provided in the component of the car air-conditioner.

A valve core 53 is provided in the middle of the flow passage 52 of the nozzle 50. The valve core 53 includes a valve core body 54, a moving shaft 55 extending through the valve core body and a valve element 56 provided on one end of the moving shaft. A coil spring 57 is provided between the valve core body 54 and the moving shaft 55. The coil spring 57 usually biases the valve element 56 so that the flow passage 52 is closed by the valve element. Furthermore, the valve element 56 is also biased by a pressure applied from the refrigerant passage 66 into a closing state. In a case where the refrigerant is charged or supplied from the distal end side of the nozzle 50, the valve core 53 is opened when a charge pressure is larger than a sum of an internal pressure of the refrigerant passage 66 and a spring force of the coil spring 57, whereupon the refrigerant is supplied from the nozzle 5 into the refrigerant passage 66.

A distal end opening of the nozzle 50 has an inner edge formed with a tapered face 58 whose diameter is gradually increased toward the distal end. The distal end opening of the nozzle 50 further has an outer edge formed with a tapered face 59 whose diameter is gradually reduced toward the distal end. The tapered face 59 has a smaller inclination than the tapered face 58. The distal end of the nozzle 50 includes a distal end face 61 which is located between the tapered faces 58 and 59 and which is perpendicular to the axis of the nozzle. The distal end of the nozzle 50 has a female thread 60 formed inner than the tapered face 58. A nozzle cap 10 in accordance with the present invention is threadedly engaged with the female thread 60.

The nozzle cap 10 comprises a cap body 11, a sealing member 12 and a cylindrical cover 13. The cap body 11 is generally tapered toward the nozzle 50 and has a distal cylindrical portion 14 having a male thread 15 formed in an outer circumferential face thereof. The male thread 15 extends from an axially middle portion of the cylindrical portion 14 to the distal end. The cylindrical portion 14 includes a portion located between the male thread 15 and the proximal end thereof. The portion serves as a seal-fitting portion 16 having a diameter smaller than a root diameter of the male thread 15.

The cap body 11 includes a portion located between the cylindrical portion 14 and the proximal end. The portion serves as a terminal wall 17 having a larger diameter than the cylindrical portion 14. The terminal wall 17 has an end face axially opposed to the distal end face 61 of the nozzle 50. A protruding wall 18 protrudes from an outer edge of the end face of the terminal wall 17 toward the nozzle 50. Before the sealing member 12 is fitted with the cap body 11, the protruding wall 18 has a cylindrical shape and extends straightforward although this is not shown. A distal end of the protruding wall 18 is crimped so as to be pushed down inside the sealing member 12 while the sealing member is placed on the end face of the terminal wall 17. Consequently, a holding wall 19 is formed which presses the outer edge 31 of the sealing member 12 against the terminal wall 17 and holds the outer edge 31 between the terminal wall and itself.

Figure 3:
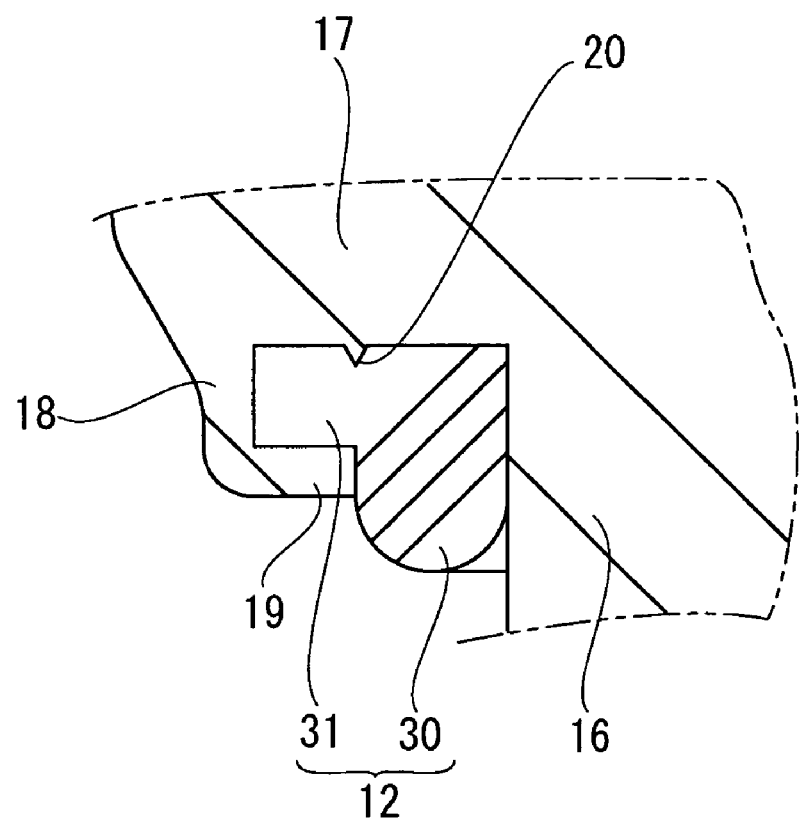
FIG. 3 is a partially enlarged section of the nozzle cap.

A engagement protrusion 20 is formed on a portion of the terminal wall 17 opposed to the inner edge of the holding wall 19 as shown in FIG. 3. The engagement protrusion 20 is tapered toward the terminal wall 17. The engagement protrusion 20 is continuously formed over the entire periphery of the terminal wall 17. When the holding wall 19 is then pressed against the sealing member 12, the engagement protrusion 20 penetrates the sealing member and is held in the penetrating state.

The sealing member 12 is formed into an annular shape and fitted with a portion of the cap body 11 between the seal-fitting portion 16 and the protruding wall 18. The sealing member 12 has an inner edge formed with an adhering protrusion 30 and an outer edge 31 formed with a flat portion held between the terminal wall 17 and the protruding wall 18. A distal end of the adhering protrusion 30 has a semicircular section before the nozzle cap 10 is attached to the nozzle 50, as shown in FIGS. 1 and 3.

Figure 4:
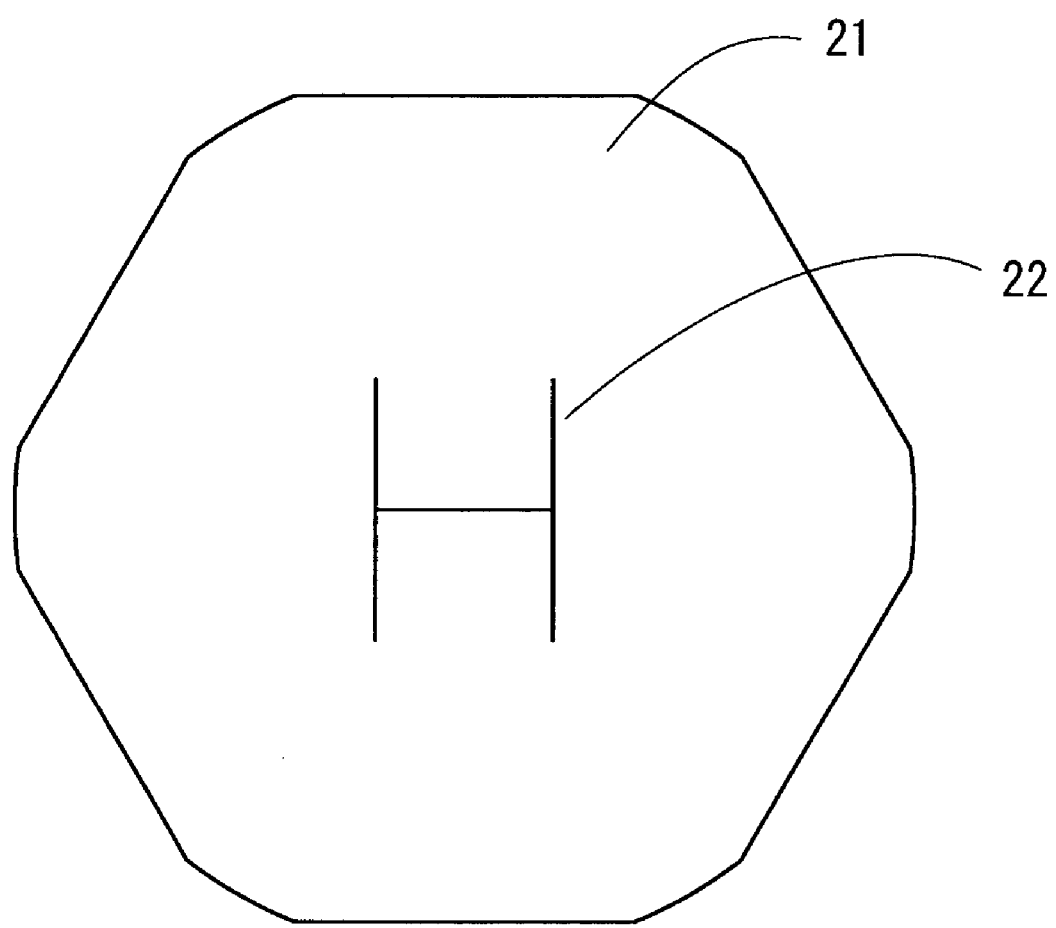
FIG. 4 is a plan view of the nozzle cap.

The cap body 11 has an end which is spaced away from the male thread 15 and is formed with an operating portion 21 extending sideways from the terminal wall 17. The operating portion 21 generally has the shape of a hexagon with chamfered vertexes as shown in FIG. 4, for example. A character mark "H" indicative of a high pressure line is printed on a central end face of the operating portion 21. The mark is designated by reference numeral "22."

The outer periphery of the cap body 11 includes a part rising from the operating portion 21. One end of the cylindrical cover 13 is fitted with the rising part. More specifically, the cylindrical cover 13 is made of a semitransparent synthetic resin. The end of the cylindrical cover 13 is formed with a first locking portion 23 which has an inner circumferential face inclined toward the center thereof or has a thickness gradually increased as the locking portion extends toward the other end of the cover. On the other hand, the cap body 11 includes a second locking portion 24 formed at the proximal end side of the protruding wall 18. The second locking portion 24 has an outer circumferential face inclined outward or has a diameter gradually increased as it gets near the operating portion 21. The cap body 11 is pushed inside the cylindrical cover 13 after the distal end of the protruding wall 18 has been crimped thereby to be formed into the holding wall 19. The cylindrical cover 13 is deformed such that it is spread, whereupon the first locking portion 23 of the cover 13 is positioned between the operating portion 21 and the second locking portion 24. As a result, the cylindrical cover 13 is prevented from falling off by the engagement of both locking portions 23 and 24 while the distal end of the cover is butted against the operating portion 21 so as to be fixed to the cap body 11.

The above-described nozzle cap operates as follows. A flow passage 52 of the nozzle 50 is closed by a valve core 53 of the nozzle when the car air conditioner has been charged with the refrigerant. However, since there is a possibility that the refrigerant may leak from the nozzle 50, the nozzle cap 10 needs to be attached to the distal end of the nozzle 50.

In order that the nozzle cap 10 may be attached to the nozzle 50, the male thread 15 of the nozzle cap 10 is threadedly engaged with the female thread 60 of the nozzle 50. The cylindrical cover 13 is made of the semitransparent resin as described above. Accordingly, the distal end of the nozzle 50 can be viewed through the cover 13. The nozzle cap 10 is threadedly engaged with the nozzle 50 until the holding wall 19 of the nozzle cap 10 is abutted against or is adjacent to the distal end 61 of the nozzle 50. The adhering protrusion 30 is pressed against the tapered face 58 thereby to adhere closely to the latter, and the inner narrow portion of the tapered face is also pushed inward such that the adhering protrusion 30 also adheres to the seal-fitting portion 16 of the cap body 11. At this time, the holding wall is prevented from deforming in such a direction that it departs from the sealing member 12 since the holding wall 19 of the nozzle cap 10 is butted against the distal end 61 of the nozzle 50. Consequently, the sealing member 12 is reliably held between the terminal wall 17 and the holding wall 19. Furthermore, the sealing member 12 is restrained from spreading so as to escape outward. Consequently, a higher sealing performance can be achieved from the foregoing nozzle cap 10 than from the conventional nozzle cap.

The nozzle cap 10 is turned in the opposed direction as that in the attachment when to be detached from the nozzle 50. In this case, the sealing member 12 is subjected to a rotational force when closely adherent to the nozzle 50. However, since the sealing member 12 is pressed and held between the terminal wall 17 and the holding wall 19, the sealing member is turned together with the cap body 11 thereby to be released from the adherence to the nozzle 50. Even if the sealing member 12 should be turned between the walls 17 and 19 while being adherent to the nozzle 50, the sealing member would be separated from the tapered face 58 of the nozzle 50 while being held at the cap body 11 side between the walls 17 and 19 and by the engagement of the engagement protrusion 20 upon axial movement in such a direction as to depart from the nozzle.

As described above, the nozzle cap 10 of the embodiment is provided with the holding wall 19 cooperating with the terminal wall 17 to press and hold the edge of the sealing member 12. Furthermore, the terminal wall 17 includes the engagement protrusion 20 penetrating into the sealing member 12. Accordingly, the sealing member 12 adherent to the nozzle 50 is prevented from being separated from the nozzle cap 10 when the nozzle cap is detached from the nozzle. Furthermore, the distal end of the protruding wall 18 is crimped to be formed into the holding wall 19 after the sealing member 12 has been assembled to the nozzle cap 10, and thereafter, the cylindrical cover 13 is fitted with the nozzle cap. Thus, the sealing member 12 can easily be assembled to the nozzle cap 10 and the protruding wall 18 can easily be crimped. Additionally, the sealing member 12 can be surrounded by the cylindrical cover 13 thereby to be protected.

Figure 5:
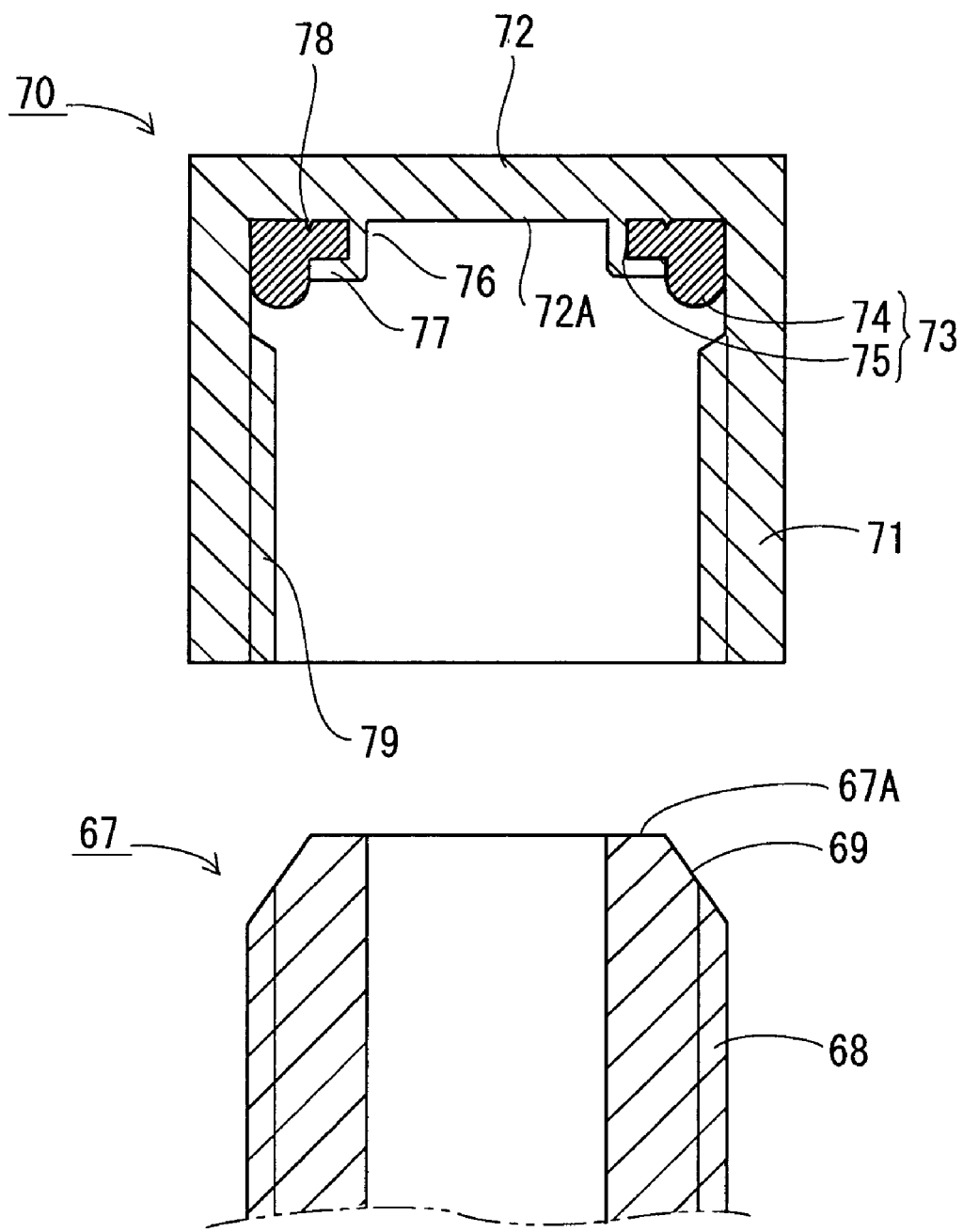
FIG. 5 is a side section of the nozzle cap in accordance with a second embodiment of the present invention.

The nozzle cap 10 is fitted with the inner circumferential wall of the nozzle 50 in the foregoing embodiment. In a second embodiment, however, the nozzle cap 70 is fitted with an outer circumferential wall of the nozzle 67 as shown in FIG. 5. Only the differences of the second embodiment from the first embodiment will be described with reference to FIG. 5.

The nozzle 70 of the second embodiment includes a cylindrical member 71 with one of two ends closed a terminal wall 72. The inner circumferential wall of the cylindrical member 71 is formed with a female thread 79 which is threadedly engaged with the male thread 68 formed on the outer circumferential face of the nozzle 67.

The terminal wall 72 includes an inner face 72A located inside the cylindrical member 71. The sealing member 73 is provided on the inner face 72A of the terminal wall 72. The sealing member 73 has a generally annular shape and includes the axially protruding adhering protrusion 74 formed along the outer circumferential edge thereof. The sealing member 73 further includes the axially flat portion 75 formed along an inner circumferential edge thereof. The terminal wall 72 includes a protruding wall 76 rising from portion of the terminal wall 72 located inside the sealing member 73. The distal end of the protruding wall 76 is crimped thereby to be pressed down toward the flat portion 75 of the sealing member 73, whereby the holding wall 77 is formed. The terminal wall 72 includes a part along which the sealing member 73 is provided. The part of the terminal wall 72 is formed with the engagement protrusion 78 protruding toward the sealing member 73. The engagement protrusion 78 penetrates into the sealing member 73 when the holding wall 77 is pressed against the sealing member.

When the nozzle cap 70 is threadedly engaged with the nozzle 67 thereby to be attached to the latter, the tapered face 69 formed on the outer edge of the distal end of the nozzle 67 adheres closely to the adhering protrusion 74 of the sealing member 73, and the distal end 67A of the nozzle 67 is butted against the holding wall 77. The nozzle cap 70 of the second embodiment constructed as described above operates in the same manner as described above in the first embodiment and achieves the same effect as that in the first embodiment.

Modified forms of the invention will now be described. The engagement protrusions 20 and 78 are formed along the overall circumferences of the terminal walls 17 and 72 in the foregoing embodiments respectively. However, the engagement protrusion may be formed discontinuously along the circumference of the terminal wall, instead.

The engagement protrusions 20 and 78 are formed on the terminal walls 17 and 72 in the foregoing embodiments respectively. However, the engagement protrusion may be formed on the holding wall or the engagement protrusions may be formed on the terminal wall and the holding wall respectively, instead.

Figure 6:
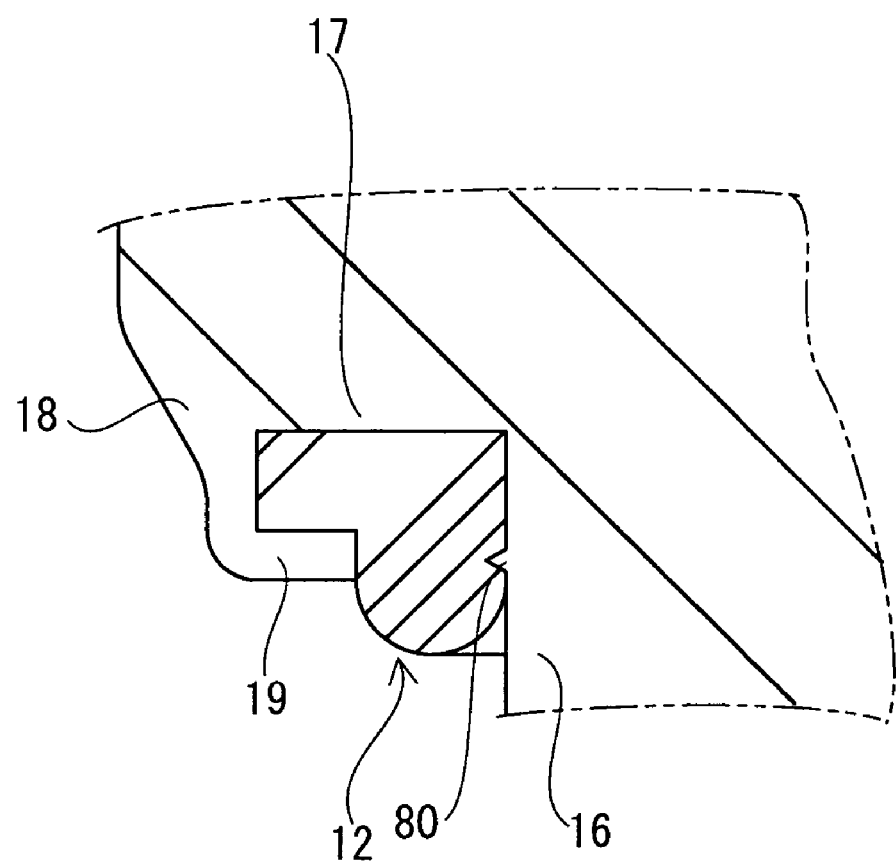
FIG. 6 is a partially enlarged section of the nozzle cap of one modified form.
Figure 7:
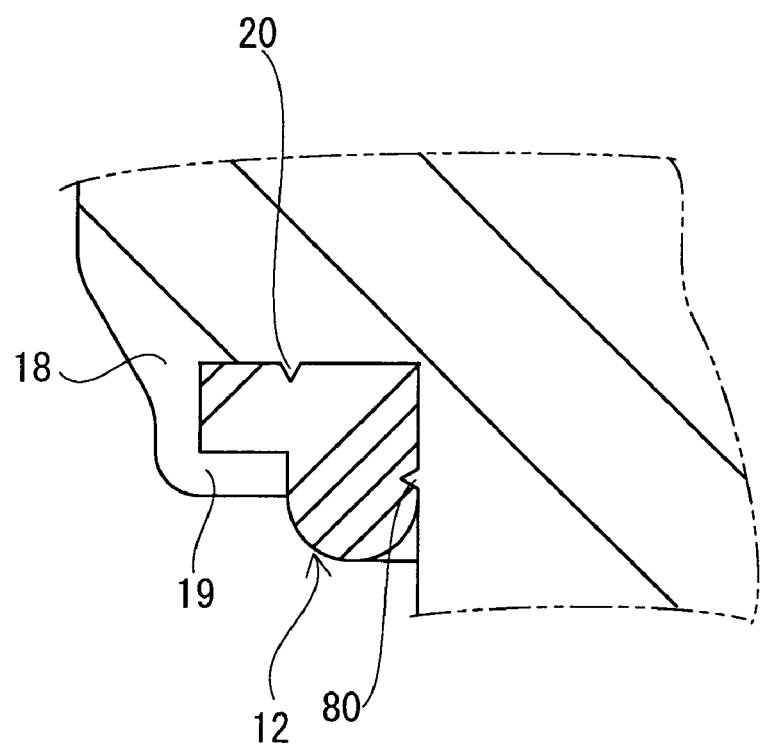
FIG. 7 is a partially enlarged section of the nozzle cap of another modified form.

A engagement protrusion 80 may be formed on the seal-fitting portion 16 in the first embodiment as shown in FIG. 6. Furthermore, the nozzle cap may include both the engagement protrusion 20 formed on the terminal wall 17 and the engagement protrusion 80 formed on the seal-fitting portion 16. Additionally, the protruding walls 18 and 76 are cylindrical in the foregoing embodiments respectively. However, the protruding wall may be formed circumferentially discontinuously, instead.

The cylindrical cover 13 is made of the synthetic resin in the first embodiment. However, the cylindrical cover may be formed of another material, instead. Furthermore, the nozzle cap 10 is attached to the nozzle 50 including the built-in valve core 53 in the first embodiment. However, the invention may be applied to a nozzle cap which is attached to a distal end of a cylindrical nozzle with no valve core, instead.

In the foregoing embodiments, the sealing members 12 and 73 are fitted with the terminal walls 17 and 72, and thereafter, the distal ends of the protruding walls 18 and 76 are crimped thereby to be bent into the holding walls 19 and 77, respectively. However, the holding wall 19 or 77 may previously be formed on the terminal wall 17 or 72, and the edge of the sealing member 12 or 73 may be pushed into the space between the terminal wall and the holding wall, instead. Furthermore, the holding wall 19 or 77 may previously be formed on the terminal wall 17 or 72, and the sealing member may be formed by pouring molten rubber or resin into the space between the terminal and holding walls, instead.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A nozzle cap threadedly engaged with a distal end of a nozzle through which a compressed fluid is capable of passing, the nozzle cap comprising:

a terminal wall opposed to a distal end face of the nozzle axially with respect to the nozzle;

a sealing member placed on the terminal wall so as to adhere closely to the distal end of the nozzle thereby to seal an opening of the nozzle; and a holding wall pressing and holding an edge of the sealing member in co-operation with the terminal wall therebetween;

wherein the holding wall comprises a protruding wall protruding from the terminal wall and bent to the sealing member side, the protruding wall is formed into a cylindrical shape and surrounds the sealing member, the nozzle has a tapered face formed on the distal end thereof, the sealing member includes an adherent protrusion which protrudes toward the tapered face of the nozzle and a flat portion located inside or outside the adherent protrusion, wherein the holding wall and the terminal wall hold the flat portion of the sealing member therebetween and the holding wall and the terminal wall extend parallel to each other such that they face each other in the axial direction.

2. The nozzle cap according to claim 1, further comprising:
a seal-fitting portion protruding from the terminal wall on the inner side of the protruding wall,
wherein the sealing member is adhered closely to both of the protruding wall and seal-fitting portion.

3. The nozzle cap according to claim 1, wherein the holding wall is butted against the distal end of the nozzle so as to be prevented from being deformed in such a direction that the holding wall departs from the terminal wall.

4. The nozzle cap according to claim 1, further comprising:
a cylindrical member protruding from the terminal wall on the outer side of the protruding wall wherein the sealing member is adhered closely to both the protruding wall and the cylindrical wall.

5. A nozzle cap threadedly engaged with a distal end of a nozzle through which a compressed fluid is capable of passing, the nozzle cap comprising:
a terminal wall opposed to a distal end face of the nozzle axially with respect to the nozzle;
a sealing member placed on the terminal wall so as to adhere closely to the distal end of the nozzle thereby to seal an opening of the nozzle; and
a holding wall pressing and holding an edge of the sealing member in co-operation with the terminal wall therebetween;
wherein the holding wall comprises a protruding wall protruding from the terminal wall and bent to the sealing member side, the protruding wall is formed into a cylindrical shape and surrounds the sealing member, the nozzle has a tapered face formed on the distal end thereof, the sealing member includes an adherent protrusion which protrudes toward the tapered face of the nozzle and a flat portion located inside or outside the adherent protrusion, wherein the holding wall and the terminal wall hold the flat portion of the sealing member therebetween and the holding wall and the terminal wall extend parallel to each other such that they face each other in the axial direction.

6. A nozzle cap threadedly engaged with a distal end of a nozzle through which a compressed fluid is capable of passing, the nozzle cap comprising:
a terminal wall opposed to a distal end face of the nozzle axially with respect to the nozzle;
a sealing member placed on the terminal wall so as to adhere closely to the distal end of the nozzle thereby to seal an opening of the nozzle;
a holding wall pressing and holding an edge of the sealing member in co-operation with the terminal wall therebetween; and
a generally cylindrical cover with first and second opposed open ends fitted with an outer periphery of the cap so as to surround the sealing member, the cylindrical cover being made of a transparent or semi-transparent synthetic resin;
wherein the nozzle has a tapered face formed on the distal end thereof, the sealing member includes an adherent protrusion which protrudes toward the tapered face of the nozzle and a flat portion located inside or outside the adherent protrusion, and wherein the holding wall and the terminal wall hold the flat portion of the sealing member therebetween.

7. A nozzle cap threadedly engaged with a distal end of a nozzle through which a compressed fluid is capable of passing, the nozzle cap comprising:
a terminal wall opposed to a distal end face of the nozzle axially with respect to the nozzle;
a sealing member placed on the terminal wall so as to adhere closely to the distal end of the nozzle thereby to seal an opening of the nozzle;
a holding wall pressing and holding an edge of the sealing member in co-operation with the terminal wall therebetween; and
a generally cylindrical cover with first and second opposed open ends fitted with an outer periphery of the cap so as to surround the sealing member, the cylindrical cover being made of a transparent or semi-transparent synthetic resin;
wherein the holding wall comprises a protruding wall protruding from the terminal wall and bent to the sealing member side, the nozzle has a tapered face formed on the distal end thereof, the sealing member includes an adherent protrusion which protrudes toward the tapered face of the nozzle and a flat portion located inside or outside the adherent protrusion, and wherein the holding wall and the terminal wall hold the flat portion of the sealing member therebetween.

8. A nozzle cap threadedly engaged with a distal end of a nozzle through which a compressed fluid is capable of passing, the nozzle cap comprising:
a terminal wall opposed to a distal end face of the nozzle axially with respect to the nozzle;
a sealing member placed on the terminal wall so as to adhere closely to the distal end of the nozzle thereby to seal an opening of the nozzle;
a holding wall pressing and holding an edge of the sealing member in co-operation with the terminal wall therebetween; and
a generally cylindrical cover with first and second opposed open ends fitted with an outer periphery of the cap so as to surround the sealing member, the cylindrical cover being made of a transparent or semi-transparent synthetic resin;
wherein the holding wall comprises a protruding wall protruding from the terminal wall and bent to the sealing member side, at least one of the terminal wall, the holding wall, and a portion of the holding wall opposed to the protruding wall is provided with an engagement protrusion biting into the sealing member, the nozzle has a tapered face formed on the distal end thereof, the sealing member includes an adherent protrusion which protrudes toward the tapered face of the nozzle and a flat portion located inside or outside the adherent protrusion, and wherein the holding wall and the terminal wall hold the flat portion of the sealing member therebetween.

9. A nozzle cap threadedly engaged with a distal end of a nozzle through which a compressed fluid is capable of passing, the nozzle cap comprising:
a terminal wall opposed to a distal end face of the nozzle axially with respect to the nozzle;

a sealing member placed on the terminal wall so as to adhere closely to the distal end of the nozzle thereby to seal an opening of the nozzle;

a holding wall pressing and holding an edge of the sealing member in co-operation with the terminal wall therebetween; and a generally cylindrical cover with first and second opposed open ends fitted with an outer periphery of the cap so as to surround the sealing member, the cylindrical cover being made of a transparent or semitransparent synthetic resin;

wherein the holding wall is disposed at a position where the distal end face of the nozzle is butted against the holding wall, the nozzle has a tapered face fonned on the distal end thereof, the sealing member includes an adherent protrusion which protrudes toward the tapered face of the nozzle and a flat portion located inside or outside the adherent protrusion, and wherein the holding wall and the terminal wall hold the flat portion of the sealing member therebetween.

* * * * *